(12) United States Patent
Emerson et al.

(10) Patent No.: US 7,697,728 B2
(45) Date of Patent: Apr. 13, 2010

(54) SYSTEM AND METHOD OF SORTING DOCUMENT IMAGES BASED ON IMAGE QUALITY

(75) Inventors: Geoffrey A. Emerson, Charlotte, NC (US); Rodney G. Moon, Charlotte, NC (US); Gerald C. Rector, Concord, NC (US); Raymond F. Stokes, Davidson, NC (US); Andrew H. Sutton, Harrisburg, NC (US)

(73) Assignee: International Business Machines Corporation, Armonk, NY (US)

( * ) Notice: Subject to any disclaimer, the term of this patent is extended or adjusted under 35 U.S.C. 154(b) by 25 days.

(21) Appl. No.: 12/133,797

(22) Filed: Jun. 5, 2008

(65) Prior Publication Data
US 2008/0232648 A1 Sep. 25, 2008

Related U.S. Application Data

(62) Division of application No. 10/425,149, filed on Apr. 28, 2003, now Pat. No. 7,406,183.

(51) Int. Cl.
*G06K 9/00* (2006.01)

(52) U.S. Cl. .................. 382/112; 382/137; 382/140

(58) Field of Classification Search .................. 382/100, 382/101, 135, 137, 140, 138, 139, 303, 304, 382/305, 112; 358/1.15, 403, 444, 296, 451, 358/1.9, 468; 399/403, 404, 402, 79; 707/104.1, 707/204
See application file for complete search history.

(56) References Cited

U.S. PATENT DOCUMENTS

| | | | |
|---|---|---|---|
| 4,264,808 A * | 4/1981 | Owens et al. .................. 705/30 |
| 4,888,812 A * | 12/1989 | Dinan et al. ................ 382/140 |
| 5,031,223 A | 7/1991 | Rosenbaum et al. |
| 5,057,936 A | 10/1991 | Bares |
| 5,097,517 A | 3/1992 | Holt |
| 5,206,915 A | 4/1993 | Kern et al. |
| 5,600,732 A | 2/1997 | Ott et al. |
| 5,692,065 A | 11/1997 | Prakash et al. |
| 5,754,674 A | 5/1998 | Ott et al. |
| 5,810,173 A * | 9/1998 | Stevens et al. .............. 209/539 |

(Continued)

FOREIGN PATENT DOCUMENTS

EP 0320713 A2 6/1989

(Continued)

OTHER PUBLICATIONS

Emerson et al., U.S. Appl. No. 12/137,030, Office Action Communication, Oct. 30, 2008, 15 pages.

(Continued)

*Primary Examiner*—Sheela C Chawan
(74) *Attorney, Agent, or Firm*—Douglas Lashmit; Hoffman Warnick LLC

(57) ABSTRACT

A document processing system and method for using image quality to sort documents. The document processing system comprises: a document sorting system that designates a destination pocket for each document based on data gathered from each document; a document imaging system that captures an image of each document; and an image quality analysis system that analyzes each image and causes any document having an unacceptable image to be redirected to an unacceptable destination pocket.

12 Claims, 3 Drawing Sheets

U.S. PATENT DOCUMENTS

| | | | |
|---|---|---|---|
| 5,845,002 | A | 12/1998 | Heck et al. |
| 5,923,791 | A | 7/1999 | Hanna et al. |
| 5,923,792 | A | 7/1999 | Shyu et al. |
| 5,963,659 | A | 10/1999 | Cahill et al. |
| 6,018,397 | A | 1/2000 | Cloutier et al. |
| 6,058,190 | A | 5/2000 | Cordery et al. |
| 6,115,509 | A | 9/2000 | Yeskel |
| 6,151,132 | A * | 11/2000 | Urquhart et al. ........... 358/1.14 |
| 6,181,812 | B1 | 1/2001 | Rodite |
| 6,370,277 | B1 | 4/2002 | Borrey et al. |
| 6,381,342 | B2 | 4/2002 | Foley |
| 6,408,084 | B1 | 6/2002 | Foley |
| 6,483,996 | B2 | 11/2002 | Phillips |
| 6,487,302 | B2 | 11/2002 | Foley |
| 7,044,463 | B2 * | 5/2006 | Brotherston et al. ..... 270/52.02 |
| 7,081,594 | B1 | 7/2006 | Khalfan et al. |
| 7,406,183 | B2 | 7/2008 | Emerson et al. |

FOREIGN PATENT DOCUMENTS

| | | |
|---|---|---|
| EP | 0667594 A2 | 8/1995 |
| JP | 09057202 | 3/1997 |
| JP | 10175356 | 6/1998 |
| JP | 11047696 | 2/1999 |
| JP | 11147078 | 6/1999 |
| JP | 11069101 | 9/1999 |
| JP | 2000042497 | 2/2000 |
| JP | 2001157876 | 6/2001 |
| JP | 2002077468 | 3/2002 |

OTHER PUBLICATIONS

Emerson et al., U.S. Appl. No. 12/137,030, Office Action Communication, Apr. 16, 2009, 17 pages.

* cited by examiner

US 7,697,728 B2

SYSTEM AND METHOD OF SORTING DOCUMENT IMAGES BASED ON IMAGE QUALITY

This application is a divisional of U.S. patent application Ser. No. 10/425,149, filed on Apr. 28, 2003, now U.S. Pat No. 7,406,183.

BACKGROUND OF THE INVENTION

1. Technical Field

The present invention relates generally to document sorting systems, and more specifically relates to a system and method of sorting checks based on image quality.

2. Related Art

Various applications require the automated processing of documents based on printed information. One common application involves the high-speed processing of checks by, e.g., a bank or other financial institution. In one such application, checks are sorted based on a set of special characters at the bottom of the check, which are called Magnetic Ink Character Recognition (MICR) characters. These characters are generally printed in a font referred to as E13B, and contain information regarding account number, routing numbers, etc. To implement such a system, the characters are printed in magnetic ink so that the characters can be read magnetically. An exemplary system is the IBM® 3890 check-sorting system, which directs checks to a desired destination or pocket based on the printed characters.

Depending on the particular application and needs of the financial institution, digital images of selective checks may also be captured as part of the check processing operation. The collected images may be used, for example, to provide electronic records for particular clients. In these cases, the check-sorting device analyzes the MICR characters to determine whether the check should be imaged. Check imaging is an independent process, and therefore does not impact the sorted destination of the check.

As part of imaging process, the quality of the image may be analyzed to determine if the quality is acceptable. Such a system is taught in U.S. Pat. No. 5,692,065, Apparatus and Method for Determining Image Quality, issued to Prakash et al., on Nov. 25, 1997, and is hereby incorporated by reference. If the image quality for a selected check is identified as unacceptable, it is flagged as suspect. If flagged, the check must then be manually retrieved by an operator who must either resubmit the check to the image/sorting process or submit it an image repair process. Unfortunately, the process of manually locating and removing flagged checks from a sorted destination can be a time consuming, costly, and error prone task.

Moreover, with the growth of imaging technologies, it is believed that electronic images will play a greater role in legally representing transactions. For instance, an original paper check is currently required to legally represent a transaction. However, it is likely that in the near future, an electronic image of a check will provide a legal basis for representing the transaction. Accordingly, imaging systems will be required to handle a larger volume of imaging tasks. Therefore, efficient systems for handling unacceptable images in document sorting devices will become necessary to avoid the overhead currently stemming from manual operations.

SUMMARY OF THE INVENTION

The present invention addresses the above-mentioned problems, as well as others, by providing a document-processing device that analyzes image quality and provides a separate sort destination for unacceptable images. In a first aspect, the invention provides a document processing system, comprising: a document sorting system that designates a destination pocket for each document based on data gathered from each document; a document imaging system that captures an image of each document; an image quality analysis system that analyzes each image and causes any document having an unacceptable image to be redirected to an unacceptable destination pocket.

In a second aspect, the invention provides a method of sorting documents based on image quality, comprising the steps of: providing a document sorting system having a plurality of destination pockets; capturing an electronic image of each document; analyzing a quality of each electronic image; and selecting a destination pocket for each document based on the quality of the electronic image corresponding to the document.

In a third aspect, the invention provides a method for processing documents, comprising: inputting document into a document processing system; gathering data from each document; designating a destination pocket for each document based on the data gathered from each document; capturing an image of each document; analyzing each image to determine an image quality; and redirecting unacceptable images to an unacceptable destination pocket.

In a fourth aspect, the invention provides an image sorting system for receiving and sorting electronic document images, comprising: an image quality analysis system that analyzes a quality of each electronic document image; and a sorting algorithm that determines an electronic location for each electronic document image based on a quality analysis of the electronic document image.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
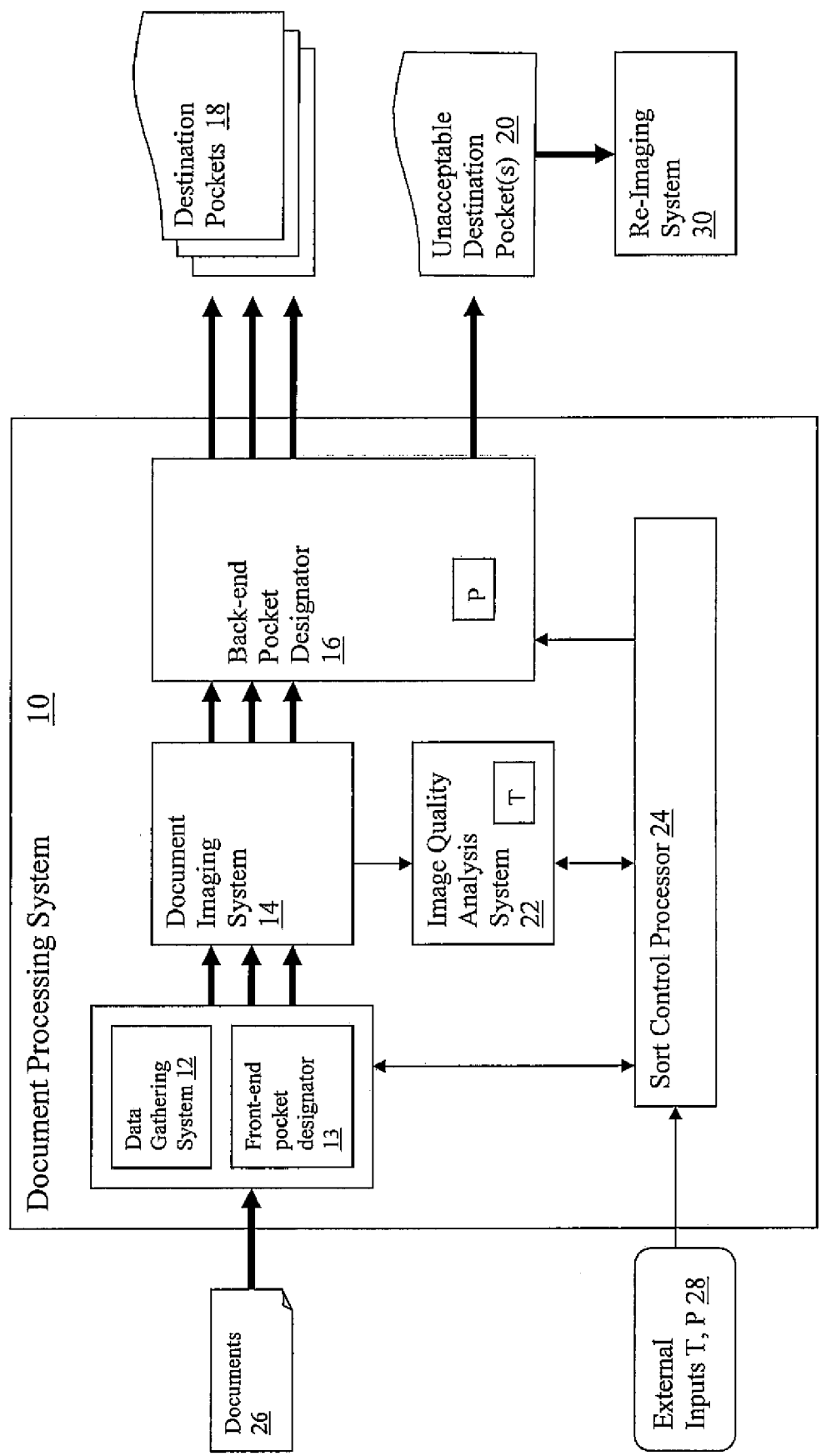
FIG. 1 depicts a document processing system in accordance with an embodiment of the present invention.

Referring now to the drawings, FIG. 1 depicts an exemplary high-speed document processing system 10 that receives a stream of documents 26 and directs each document to one of a plurality of destination pockets 18 and 20. Document processing system 10 includes a data gathering system 12 and front-end pocket designator 13 that read characters or other data off of each document 26 and designate a destination pocket 18 based on the gathered data. Data gathering system 12 may, for instance, be implemented using a MICR system for reading magnetic ink characters printed on the documents 26. It should be understood however, that any type of system for gathering document data could be utilized (e.g., an optical character reader "OCR" system). A sort control processor 24 can be utilized to provide the logic and computational resources to determine which destination pockets 18 are to be designated for each of the documents 26. Present check-sorting devices, such as the IBM 3890 currently utilize this type of technology.

After a pocket has been designated, the document 26 is passed to an imaging system 14, which captures an electronic image of the document 26. In an alternative embodiment, imaging system 14 could be integrated as part of the data gathering system 12, so that the gathering of data is achieved as part of the document imaging process. However, in most high-speed applications, two separate systems are often necessary.

In an exemplary embodiment, the electronic image captured by imaging system 14 is used to represent a legal transaction involving a negotiable instrument (e.g., a bank check). In such an exemplary embodiment, the electronic image must meet a predetermined quality to support any legal challenge to the transaction. For instance, if document data, such as the dollar amount, account number, or signature, is illegible, the document may fail to sufficiently evidence the transaction.

To address this, the present invention includes an image quality analysis system 22 that reads and analyzes the electronic image. Image quality analysis system 22 can use any known means for quantifying the quality of the electronic image of each document 26. In an exemplary embodiment, the image can be compared to a predetermined quality threshold T that, e.g., represents a minimum quality necessary to legally validate the transaction. The threshold T could be a preset standard, or be adjusted as an external input 28 for a particular application. For instance, the legal standard of image quality may change depending on the type of document, country or state in which the image is stored, etc. Moreover, the threshold could be adjusted dynamically based on an internal algorithm of the sort control processor 24. For instance, the threshold could be adjusted based on the dollar amount of the check, the bank of origin, etc.

As a result of the analysis provided by image quality analysis system 22, a decision is made as to whether each document is of acceptable quality. This decision is captured by the sort control processor 24 and is passed to the back-end pocket designator 16. If the quality of the corresponding electronic image for a document is acceptable, the back-end pocket designator 16 honors the original destination pocket 18 determined by the front-end pocket designator 12. Conversely, if the quality of the corresponding electronic image for a document is unacceptable, then the back-end pocket designator 16 redirects the document to the unacceptable image pocket 20. The location P of the unacceptable image pocket 20 can be selected as an external input 28, e.g., by the end user.

In a further embodiment, multiple unacceptable image pockets 20 could be used, for example, to sort documents having images that fall into different predetermined quality ranges. For instance, documents having marginal image quality could be forwarded to a first unacceptable image pocket, while other documents having seriously bad image quality could be forwarded to a second unacceptable image pocket. Alternatively, documents having unacceptable images could be sorted based on what portion of the electronic image is unacceptable, e.g., the signature block, the dollar amount, the account number, etc.

Moreover, in even a further embodiment of the invention, pocket selection could be determined solely by image quality (i.e., without the use of a front-end pocket designator). In this embodiment, the data gathered from the documents would not necessary influence the destination.

After documents are collected in the unacceptable image pocket or pockets 20, they can be re-imaged, either manually by an operator who physically removes and submits the documents to a re-imaging system, or by an automated process that automatically forwards the documents to a re-imaging system 30. Because all documents having unacceptable images are forwarded to a predetermined location (or locations), the operator is not required to waste time and resources searching through the multiple destination pockets 18, which may hold tens, hundreds, or even thousands of documents.

Figure 2:
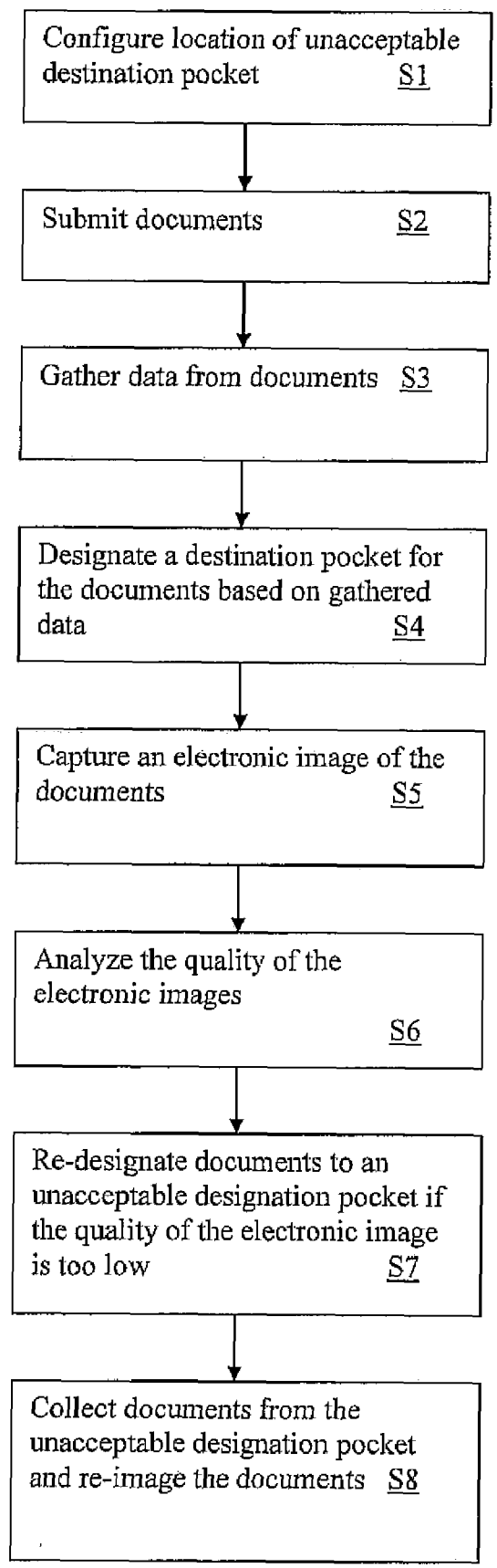
FIG. 2 depicts a flowchart of a document processing method in accordance with the present invention.

Referring now to FIG. 2, a flow diagram of the business methodology of sorting documents in accordance with an embodiment of the invention is depicted. In step S1, the location of the unacceptable designation pocket(s) 20 is configured, e.g., via a graphical user interface in communication with a document processing system. Next, at step S2 documents are submitted into the document processing system. At step S3, data is gathered from each document, e.g., using a MICR system or the like. At step S4, a destination pocket is selected for each document based on data gathered in step S3. Next, at step S5, an electronic image of the document is captured, and at step S6, the image is analyzed to determine if it meets an acceptable quality level. In an exemplary embodiment, the acceptable quality level represents a minimum quality necessary to establish a legal transaction.

At step S7, the document is redirected to an unacceptable designation pocket if the quality of the electronic image is unacceptable, e.g., fails to meet the minimum quality necessary to establish a legal transaction. Finally, at step S8, documents are collected from the unacceptable designation pocket and re-imaged.

Figure 3:
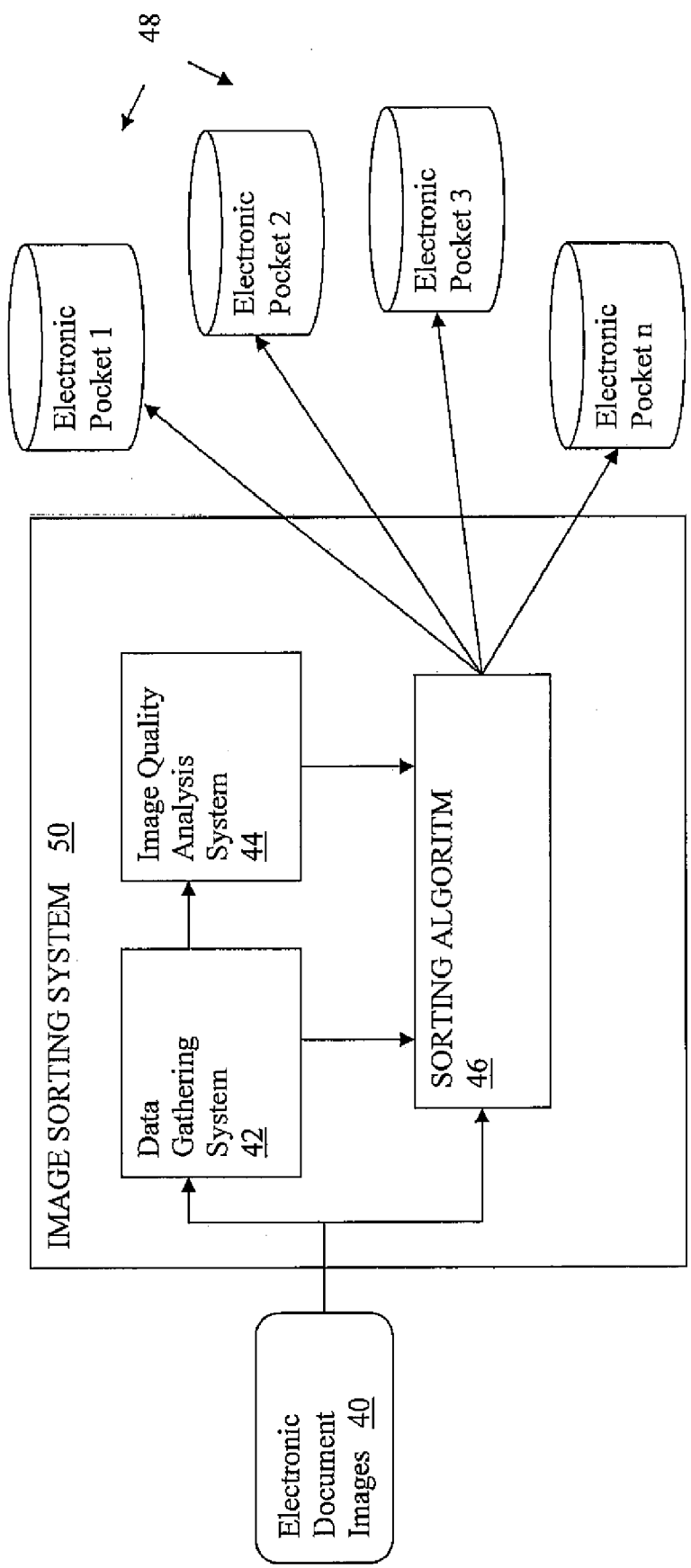
FIG. 3 depicts an image sorting system in accordance with the present invention.

Referring now to FIG. 3, an image sorting system 50 is provided for receiving electronic document images 40 and sorting them into electronic pockets 48 (i.e., electronic locations). In this exemplary embodiment, the electronic document images 40 can be obtained from any source, e.g., a magnetic or optical storage device, via a transmission channel, etc, and be represented in any format (e.g., bitmap, JPEG, etc.). Similarly, the electronic pockets 48 can be implemented in any manner, e.g., any electronic or digital medium or transmission channel. For instance, electronic pockets 48 may be implemented as different locations within a hard drive or on a compact disk. Alternatively, electronic pockets 48 may be implemented as addresses on a network that are equipped to receive the electronic document images 40.

Image sorting system 50 includes a sorting algorithm 46 that assigns an electronic pocket to each image. Image sorting system 50 also may include a data gathering system 42 that collects data from each document (e.g., account number, etc.) and an image quality analysis system 44 that analyzes the quality of each image (e.g., acceptable, unacceptable, marginally acceptable, etc.). Systems 42 and 44, as well as sorting algorithm 46, may be implemented with the same features as those discussed above with respect to FIG. 1, and therefore are not discussed in detail. Sorting algorithm 46 may determine the destination of each image using information provided by either or both of data gathering system 42 and image quality analysis system 44. Any logic may be utilized in the decision making process.

For instance, if the inputted image comprised a bank check, the data gathering system 42 could read and pass the check information to the sorting algorithm 46. Image quality analysis system 42 could determine if the quality of the bank check image was sufficient to legally evidence a valid transaction (e.g., as compared to some threshold or set of thresholds). Based on the collected information, sorting algorithm 46 could direct the electronic document image to the proper electronic pocket. For example, electronic pocket 1 could be utilized to store all unacceptable images from United States banks; pocket 2 could be utilized to store all unacceptable images from oversees banks; pocket 3 could be utilized to store all acceptable images from BANK A; etc.

It is understood that the systems, functions, mechanisms, methods, and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention has been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

The invention claimed is:

1. A method of sorting documents based on image quality, comprising the steps of:
    providing a document sorting system having a plurality of destination pockets;
    capturing an electronic image of each document;
    automatically quantifying a quality of each electronic image using a computing device; and
    automatically selecting a destination pocket for each document using the computing device based on the quality of the electronic image corresponding to the document.

2. The method of claim 1, wherein at least one of the destination pockets is utilized to collect unacceptable electronic images.

3. The method of claim 2, wherein the step of providing the document sorting system includes the step of providing an interface to allow a user to configure which of the destination pockets will be utilized to collect unacceptable electronic images.

4. The method of claim 2, wherein the step of providing the document sorting system includes the step of providing an interface to allow a user to configure at least one threshold level that will determine whether an electronic image is unacceptable.

5. The method of claim 4, wherein said at least one threshold level represents a minimum quality necessary to establish a legal transaction.

6. The method of claim 1, comprising the further step, prior to the capturing step, of preselecting a destination pocket for each document based on data gathered from the document.

7. The method of claim 5, wherein each document comprises a negotiable instrument.

8. The method of claim 1, wherein the step of selecting a destination pocket for each document is further based on data gathered from each document.

9. An image sorting system for receiving and sorting electronic document images, comprising:
    an image quality analysis system that quantifies a quality of each electronic document image; and
    a sorting algorithm that determines an electronic location for each electronic document image based on the quality of the electronic document image as determined by the image quality analysis system.

10. The image sorting system of claim 9, wherein the quality analysis determines whether a quality of each electronic document image is sufficient to establish a legal transaction.

11. The image sorting system of claim 9, further comprising a data gathering system that collects data from each electronic document image.

12. The image sorting system of claim 11, wherein the sorting algorithm further determines the location for each electronic document image based on the collected data.

* * * * *